United States Patent [19]

Lindgren

[11] Patent Number: 4,516,022

[45] Date of Patent: May 7, 1985

[54] DETECTION OF LIGHT-PRODUCING EVENTS

[75] Inventor: Carl E. Lindgren, Västerås, Sweden

[73] Assignee: ASEA Aktiebolag, Västerås, Sweden

[21] Appl. No.: 413,828

[22] Filed: Sep. 1, 1982

[30] Foreign Application Priority Data

Sep. 4, 1981 [SE] Sweden ................. 8105259

[51] Int. Cl.³ ............................... G02B 5/14
[52] U.S. Cl. .................... 250/227; 250/239; 350/96.1
[58] Field of Search ............ 250/227, 239, 216; 455/619; 356/236; 350/96.1

[56] References Cited

U.S. PATENT DOCUMENTS 2,612,817 10/1952 Willcox ................ 250/216
4,369,364 1/1983 Kuntermann ........... 250/227
4,422,719 12/1983 Orcutt ................ 350/96.1

FOREIGN PATENT DOCUMENTS 2054119 of 1981 United Kingdom .

Primary Examiner—David C. Nelms
Assistant Examiner—Jim Gatto
Attorney, Agent, or Firm—Watson, Cole, Grindle & Watson

[57] ABSTRACT

A device for detecting undesired, light-producing events in a protected installation, for example arcing of electrical apparatus or the outbreak of fire in a building, comprises a detector for receiving light produced directly or indirectly by the undesired event and directing at least part thereof into the field of view of fiber optic means which transmits at least part of the received light to a monitoring unit. The detector is in the form of material applied to an end of the fiber optic means situated at the protected installation, the detector material being in the form of at least one light-transmitting body with a large number of light-refracting surfaces within the same which refract received light and conduct at least part of the refracted light into the field of view of the fiber optic means.

10 Claims, 2 Drawing Figures

DETECTION OF LIGHT-PRODUCING EVENTS

TECHNICAL FIELD

This invention relates to a device for detecting an undesired, light-producing event in a protected installation, which device is of the kind comprising a detector for receiving light produced directly or indirectly by the event and directing at least part thereof into the field of view of fiber optic means which transmits the noted part of the received light to a monitoring unit, for example a measuring and/or indicating means, which may be situated, for example, at a location remote from the protected installation.

Examples of protected installations in which a device in accordance with the invention may be employed are electrical apparatus, for example switchgear, in which the device may be employed to detect the occurrence of undesired electric arcs, rooms in which the device may be employed to detect the occurrence of fires, and laboratories and chemical plants where the device may be employed to detect light signals produced indirectly by the escape into the atmosphere of toxic or other dangerous substances.

BACKGROUND ART

A device for detecting undesired arcing in electrical apparatus is disclosed in Lindgren et al's U.S. Patent Application Ser. No. 180,854 filed on Aug. 25, 1980, and assigned with the present application to a common assignee. In this known device, one or more light reflecting or light refracting members are arranged near the end of at least one optical fiber that is situated in the vicinity of a detecting unit, and the task of these members is to reflect or conduct light, caused by undesirable arcing, from locations within the electrical apparatus which lie outside the ordinary field of view of the optical fiber or fibers, which light is then conducted via the fiber(s) to measuring or indicating members at an indicating unit. The reflecting members may consist of mirrors, of parabolic, plane or other shapes, which are arranged to reflect light rays occurring within the detected space into the field of view of the optical fiber(s). The reflecting member or members may also consist of granular members or members which are fibrous on the surface, which are arranged at least partially to reflect light occurring within the detected space into the field of view of the optical fiber(s).

The primary object of the present invention is to provide an improved detecting device of the kind referred to, in which the field of view of the fiber optic means is increased compared with the known detecting device, and which constitutes a robust and reliable device for monitoring the occurrence of undesired, light-producing events.

DISCLOSURE OF THE INVENTION

According to the invention, in a device of the kind referred to for detecting an undesired, light-producing event in a protected installation, the detector comprises a material applied to an end of the fiber optic means situated at the protected installation, the noted material being in the form of at least one light-transmitting body with a large number of light-refracting surfaces within the same which refract the received light and conduct at least part of the refracted light into the field of view of the fiber optic means.

In a preferred embodiment of the device in accordance with the invention, the at least one light-transmitting body may consist of at least one body of cellular plastic material containing a large number of voids or gas-filled cavities. Alternatively, the at least one light-transmitting body may comprise a large number of light-transmitting granules, for example glass granules, pressed or otherwise joined together in random manner. In each case, the material of the detector acts as an assembly of a large number of lenses or blisters at least some of which refract the incident light which reaches them into the field of view of the fiber optic means. The material of the detector may be manufactured in the form of a sheath which fits over an exposed end of the fiber optic means.

BRIEF DESCRIPTION OF THE DRAWING

The invention will not be described, by way of example, with reference to the accompanying drawing, wherein.

DESCRIPTION OF PREFERRED EMBODIMENTS

Figure 1:
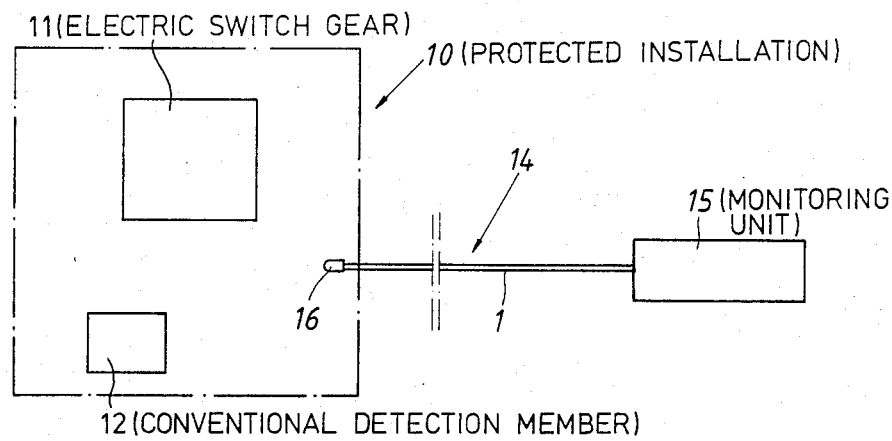
FIG. 1 is a schematic diagram of a detecting means in accordance with the invention.

In FIG. 1, the numeral 10 generally designates a protected installation in which an undesired, light-producing event may occur. For example, the installation 10 may be a cubicle for an electric switchgear 11 which it is desired to monitor as regards the occurrence of undesired arcing. Alternatively, the installation 10 may be a room or other space in which it is desired to detect the outbreak of fire. Again, the installation 10 may be a laboratory or chemical plant in which it is desired to monitor the escape into the atmosphere of harmful substances, the escape of which is initially detected by a conventional detection member 12 which, when the concentration of harmful substance in the atmosphere exceeds a predetermined level, emits a light signal.

The detecting device in accordance with the invention comprises a fiber optic means, generally designated by the numeral 14, which comprises one or more optical fibers 1 leading from the installation 10 to a monitoring unit 15 situated externally of the installation 10. An end of the fiber optic means 14, which is located in the installation 10, is provided with a detector 16 which receives light produced by the occurrence of an undesired, light-producing event in the installation 10 and directs at least part of the received light into the field of view of the fiber optic means 14. The light received in this way by the fiber optic means 14 is transmitted via the fiber(s) 1 to the monitoring unit 15. The unit 15 may perform one or more of various functions. For example, it may record the fact that the undesired event has occurred, it may measure the duration and/or intensity of the event, it may give a warning signal to indicate that an undesired event has occurred, and it may initiate some action in the installation 10 to rectify the situation or inactivate apparatus which is causing the undesired event.

Figure 2:
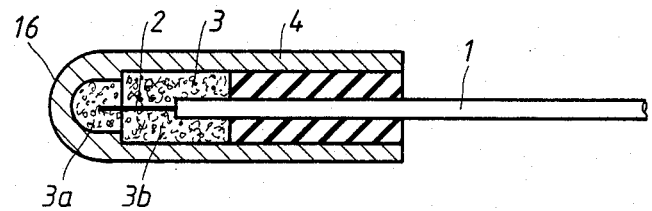
FIG. 2 is a sectional side view of one embodiment of a detector employed in the detecting means of FIG. 1.

FIG. 2 shows a preferred embodiment of the detector 16. In this Figure, the numeral 2 designates an end of a strand or cable of the optical fiber 1. Around the end 2 and around an end portion of the fiber 1 there is arranged the detector 16, which comprises material 3 which may consist of one or more light-transmitting bodies containing a large number of cavities. For example the material 3 may consist of one or more bodies of foamed or cellular plastic material or foamed glass. Alternatively, the material 3 may be formed from a large number of light-transmitting granules, for example of plastic material or glass. The material 3 thus consists of a large number of small blisters or lenses, which are distributed or joined together, respectively, in a random manner during the manufacture of the material, for example during the forming, such as casting, of a body with cavities or pressing or inserting into a mould of small particles of light-transmitting material. The material 3 constitutes a very good conductor for light approaching the detector 16 with different angles of incidence, and a proportion of the light received by the bodies 3 will be refracted into the field of vision of the fiber 1 despite its small opening angle.

In one embodiment of the detector 16, the material 3 consisted of two pre-formed bodies 3a and 3b of foamed plastic material, for example expanded polystyrene of the kind employed in the packaging industry. This material has small cavities or blisters distributed throughout, each with a maximum transverse dimension in the range of from about 0.2 to about 1 mm, there being approximately five hundred of such cavities per cubic centimeter of the material.

The detector 16 may comprise a sheath 4 into which the material 3 is moulded, pressed or otherwise inserted. The sheath 4 must, of course, be light-transmitting and it may, for example, consist of glass, such as plexiglass. The sheath 4 may also be formed as a lens and may provide a further wide-angle perspective and, in addition, mechanical protection for the fiber end 2. The detector 16 is easy to install and is resistant to various forms of stress to which it may be subjected in the installation 10.

In the monitoring unit 15, the received light is suitably transformed into electric current. In the case where the installation 10 comprises electrical apparatus in which arcing may occur due to the existence of a short-circuit current in the apparatus, it is desirable to incorporate a discriminating device in the monitoring unit 15, which prevents the monitoring unit from responding to the reception of a light signal via the fiber optic means 14 unless, at the same time, a short circuit current flows in the monitored apparatus. In this way, undesired indications at the monitoring unit 15, caused for example by a flash of lightning, can be prevented.

Whilst preferred examples of the detecting device in accordance with the invention have been described in detail above, with reference to the drawing, it will be appreciated that the device can be varied in many ways within the scope of the ensuing claims.

What is claimed is:

1. In a device for detecting an undesired, light-producing event in a protected installation, said device including a detector, a fiber optic means and a monitory unit, said detector being capable of directing at least part of the light produced by the undesired event into the field of view of a first end of the fiber optic means, the second end of the fiber optic means being connected to said monitoring unit, the improvement wherein said detector comprises at least one body surrounding said first end of said fiber optic means, each said body being composed of a material which defines therein a plurality of light-refracting surfaces which refract at least some of the light striking said material from the undesired event into the field of view of the first end of said fiber optic means.

2. The device as defined in claim 1, wherein the material of at least one said body is cellular plastic.

3. The device as defined in claim 1, wherein the material of at least one said body is expanded polystyrene.

4. The device as defined in claim 1, wherein the material of at least one said body comprises a plurality of granules which are randomly joined together.

5. The device as defined in claim 1, wherein detector includes a light-transmitting sheath enclosing each said body.

6. The device as defined in claim 1, wherein said light-transmitting sheath is composed of glass.

7. The device as defined in claim 1, wherein said fiber optic means includes at least one optical fiber which extends from said detector to said monitoring unit, and wherein one said body surrounds the adjacent end of each said optical fiber.

8. The device as defined in claim 1, wherein said detector includes two said bodies.

9. The device as defined in claim 1, wherein said protected installation contains electrical apparatus which can arc, and wherein said monitoring unit includes a discriminating device which prevents response of said monitoring unit to the reception of light from said fiber optic means unless a short circuit current simultaneously flows in said electrical apparatus.

10. The device as defined in claim 5, wherein said light-transmitting sheath is constructed to refract at least some of the light striking it from the undesired event towards a focus at or near the first end of said fiber optic means.

* * * * *